(12) United States Patent
Luo

(10) Patent No.: US 6,282,054 B1
(45) Date of Patent: Aug. 28, 2001

(54) TEETH LOCK RING FOR A DISC STACK

(75) Inventor: Erming Luo, Norman, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/395,413

(22) Filed: Sep. 14, 1999

Related U.S. Application Data

(60) Provisional application No. 60/100,216, filed on Sep. 14, 1998.

(51) Int. Cl.[7] .................................................. G11B 17/028
(52) U.S. Cl. ........................................................ 360/98.08
(58) Field of Search ........................... 360/98.08, 99.05, 360/99.12; 369/258, 264, 270, 271, 282

(56) References Cited

U.S. PATENT DOCUMENTS

| | | | |
|---|---|---|---|
| 5,075,808 | * 12/1991 | Johnson | 360/98.08 |
| 5,101,306 | * 3/1992 | Johnson | 360/98.08 |

FOREIGN PATENT DOCUMENTS

| | | |
|---|---|---|
| 62-8357 | * 1/1987 | (JP) . |
| 63-298882 | * 12/1988 | (JP) . |

* cited by examiner

*Primary Examiner*—Craig A. Renner
*Assistant Examiner*—Angel Castro
(74) *Attorney, Agent, or Firm*—Crowe & Dunlevy

(57) ABSTRACT

Apparatus and method for clamping discs in a disc stack assembly to provide even distribution of clamping force upon the discs. A teeth lock ring disposed atop a disc stack includes an annular member with a central opening for passing over a spindle motor hub. The teeth lock ring further includes a plurality of grooves and wedge shaped portions alternatively and circumferentially disposed about an inner diameter. Corresponding teeth on the spindle motor hub lock into each of the plurality of grooves. The circumferentially extending wedge shaped portions secure within corresponding grooves on the spindle motor hub. The teeth lock ring effectively compresses a clamp to provide uniform contact between the clamp and a top most disc to prevent disc waviness.

10 Claims, 3 Drawing Sheets

TEETH LOCK RING FOR A DISC STACK

RELATED APPLICATIONS

This application claims the benefit of United States Provisional Application No. 60/100,216 filed Sep. 14, 1998.

FIELD OF THE INVENTION

This invention relates generally to the field of disc drive data storage devices and more particularly, but not by way of limitation, to providing even distribution of clamping force of a disc stack.

BACKGROUND OF THE INVENTION

Data storage devices of the type known as "Winchester" disc drives are well known in the industry. Such devices magnetically record digital data on a plurality of circular, concentric data tracks on the surfaces of one or more rigid discs. The discs are typically mounted for rotation on the hub of a brushless direct current spindle motor. In disc drives of the current generation, the discs are rotated at speeds of up to 10,000 revolutions per minute.

Data are recorded to and retrieved from the discs by an array of vertically aligned read/write head assemblies, or heads, which are controllably moved from track to track by an actuator assembly. Each head typically comprises electromagnetic transducer read and write elements which are carried on an air bearing slider. The slider acts in a cooperative hydrodynamic relationship with a thin layer of air dragged along by the spinning discs to fly each head in a closely spaced relationship to the disc surface. In order to maintain the proper flying relationship between the heads and the discs, the heads are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to a disc drive housing base member at a location closely adjacent an outer edge of the discs. The pivot shaft is mounted such that its central axis is normal to the plane of rotation of the discs. An actuator bearing housing is mounted to the pivot shaft by an arrangement of precision ball bearing assemblies, and supports, in turn, a flat coil which is immersed in a magnetic field of an array of permanent magnets which are fixedly mounted to the disc drive housing base member.

On the side of the actuator bearing housing opposite to the coil are a plurality of vertically aligned, radially extending actuator head mounting arms to which the head suspensions mentioned above are mounted. When current is applied to the coil, a magnetic field is formed surrounding the coil which interacts with the magnetic field of the permanent magnets to rotate the actuator bearing housing about the pivot shaft, thereby moving the heads across the disc surfaces.

Disc drives of the current generation are included in desk-top computer systems for office and home environments, as well as in laptop computers which, because of inherent portability, can be used wherever they can be transported. Because of this wide range of operating environments, the computer systems, as well as the disc drives incorporated in them, must be capable of reliable operation over a wide range of ambient temperatures.

Laptop computers can further be subjected to large magnitudes of mechanical shock as a result of handling. It is common in the industry, therefore, to require disc drives to operate over a wide range of ambient temperatures as well as to be able to withstand substantial mechanical shocks without becoming inoperable.

One of the areas of disc drive design which is of particular concern when considering ambient temperature variations and mechanical shock resistance is the system used to mount the discs to the spindle motor. During manufacture the discs are mounted to the spindle motor in a temperature and cleanliness controlled environment. Once mechanical assembly of the disc drive is completed, special servo-writers are used to prerecord servo information on the discs. This servo information is used during operation of the disc drive to control the positioning of the actuator used to move the read/write heads to the desired data location in a manner well known in the industry. Once the servo information has been recorded on the discs, it is essential that the servo information, and all data subsequently recorded, spin in a concentric relation to the spin axis of the spindle motor. The discs, therefore, must be mounted to the spindle motor in a manner that prevents shifting of the discs relative to the spindle motor when subjected to a mechanical shock.

Several systems for clamping discs to spindle motor hubs have been disclosed in the prior art, including U.S. Pat. No. 5,528,434, issued to Bronshvatch et al. on Jun. 18, 1996; U.S. Pat. No. 5,517,376, issued to Green on May 14, 1996; U.S. Pat. No. 5,452,157, issued to Chow et al. on Sep. 19, 1995; U.S. Pat. No. 5,333,080, issued to Ridinger et al. on Jul. 26, 1994; U.S. Pat. No. 5,274,517, issued to Chen on Dec. 28, 1993; and U.S. Pat. No. 5,295,030, issued to Tafreshi on Mar. 15, 1994, all assigned to the assignee of the present invention. In each of these disc clamping systems the spindle motor includes a disc mounting flange that extends radially from a lower end of the spindle motor hub. A first disc is placed over the hub during assembly and brought to rest on this disc mounting flange. An arrangement of disc spacers and additional discs are then alternately placed over the hub until the intended "disc stack" is formed. Finally, a disc clamp of selected construction (such as spring or shrink-fit) is attached to the spindle motor hub to exert an axially directed clamping force against the uppermost disc in the disc stack. This axial clamping force is passed through the discs and disc spacers and squeezes the disc stack between the disc clamp and the disc mounting flange. This technique requires that the resulting friction between the clamp and top disc and between the bottom disc and disc mounting flange be sufficient to resist movement of the entire disc pack in response to a shock event.

With an industry trend toward size reduction in the overall disc drive, the size of various components within the disc drive has necessarily been reduced, including the thickness of the discs. As the discs have become thinner, the amount of clamping force that can be applied to the discs without causing mechanical distortion of the discs is limited. That is, variation in the flatness of the disc mounting flange, the discs, and the disc spacers contribute to flatness concerns of the discs relative to the heads. The elastic modulus of the disc material, too, affects the flatness of the joined assembly providing the disc pack. Moreover, uneven distribution of the clamping force upon the top most disc of a disc stack can attribute to disc waviness, thus distorting the disc and possibly adjacent heads. These and other factors limit the axial clamping force that can be applied using presently available techniques.

With continued demand for ever increasing levels of mechanical shock resistance, there remains a continued need for improvements in the manner in which discs are clamped to the spindle motors of disc drives. It is to such improvements that the present invention is directed.

SUMMARY OF THE INVENTION

The present invention is directed to an apparatus and method for improving clamping force distribution in a disc drive.

As exemplified by preferred embodiments, a disc drive includes a spindle motor comprising a rotatable spindle motor hub. The spindle motor hub is configured to rotate at least a first disc and a top most disc. The spindle motor hub further has a top portion extending above the top most disc, the top portion having circumferentially extending teeth and grooves, alternatively disposed.

A disc support member extending from the spindle motor hub supports the first disc while a spacer separates the first disc and the top most disc. A clamp, also known as a compressible clamp member, is place in contacting engagement with the top most disc and over the top portion of the spindle motor hub so that the first disc, the spacer, and the top most disc are clamped relative to the spindle motor hub in response to a clamping force exerted upon the top most disc by the clamp and the disc support member. The clamp has an inner diameter so that the inner diameter has a hub contact surface and a non-contact surface. The hub contact surface contacts the spindle motor hub at the circumferentially extending teeth.

A teeth lock ring placed over the clamp locks onto the circumferentially extending teeth of the spindle motor hub so that the clamp uniformly contacts the top most disc to provide even distribution of the clamping force to reduce disc waviness. In particular, the teeth lock ring comprises an annular member having a central opening and being securely affixed about the top portion of the spindle motor hub. The teeth lock ring has an inner diameter with a plurality of grooves and wedge shaped portions alternatively and circumferentially disposed thereabout. The plurality of wedge shaped portions effectively compress the inner diameter of the clamp at the non-contact surface to create even distribution of contact between the top most disc and the clamp and thereby preventing disc waviness.

These and various other features as well as advantages which characterize the present invention will be apparent from a reading of the following detailed description and a review of the associated drawings.

DETAILED DESCRIPTION OF THE INVENTION

Figure 1:
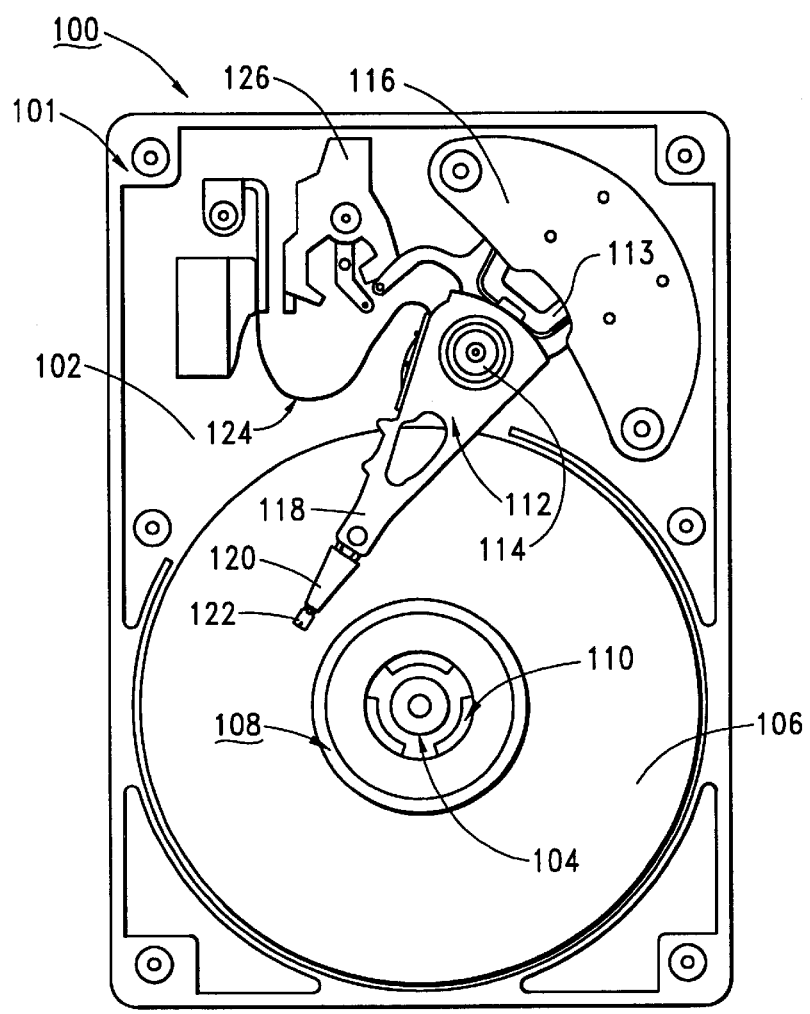
FIG. 1 is a top plan view of a disc drive constructed in accordance with preferred embodiments of the present invention.

In order to set forth a detailed description of various presently preferred embodiments of the present invention, reference is first made to FIG. 1 which shows a top plan view of a disc drive 100 used to store computer data. The disc drive 100 includes a head-disc assembly (HDA) 101 and a printed wiring assembly (PWA) which is mounted to the underside of the HDA. Although not visible in FIG. 1, it will be understood that the PWA is used to control the operation of the HDA 101.

A top cover (omitted from FIG. 1) mates with a base deck 102 to provide an environmentally controlled environment for the HDA 101. A spindle motor (generally designated at 104) is supported by the base deck 102 and rotates a plurality of axially aligned discs 106 at a constant high speed. A clamp, or compressible clamp member, 108 clamps the discs 106 relative to the spindle motor 104 to improve the mechanical shock resistance of the disc drive 100. As discussed further below, a teeth lock ring 110 compresses the clamp 108 to provide uniform distribution of clamping force.

The discs 106 include recording surfaces (not separately identified in FIG. 1) to which user data are written by way of a rotary actuator 112, which rotates about a cartridge bearing assembly 114 in response to the application of current to a coil (113, a portion of which is visible in FIG. 1) of a voice coil motor (VCM) 116. The actuator 112 includes a plurality of rigid arms 118, each of which supports a corresponding flexible suspension assembly 120. Each suspension assembly 120 in turn supports a head 122 over each of the respective recording surfaces of the discs 106 by an air bearing established by air currents set up by the high speed rotation of the discs 106. It will be noted that the suspension assemblies 120 provide spring forces which urge the heads 122 toward the respective disc surfaces, and the heads 122 are provided with aerodynamic features that fly the heads 122 over the disc surfaces in a highly stable manner.

A flex circuit assembly 124 facilitates electrical interconnection between the actuator 112 and the disc drive PWA. A latch 126 secures the actuator 112 when the disc drive 100 is deactivated, allowing the heads 122 to safely come to rest upon landing zones (not separately identified) located at the innermost radii of the discs 106. The landing zones are preferably texturized to prevent stiction forces from undesirably adhering the heads 122 to the landing zones.

Figure 2:
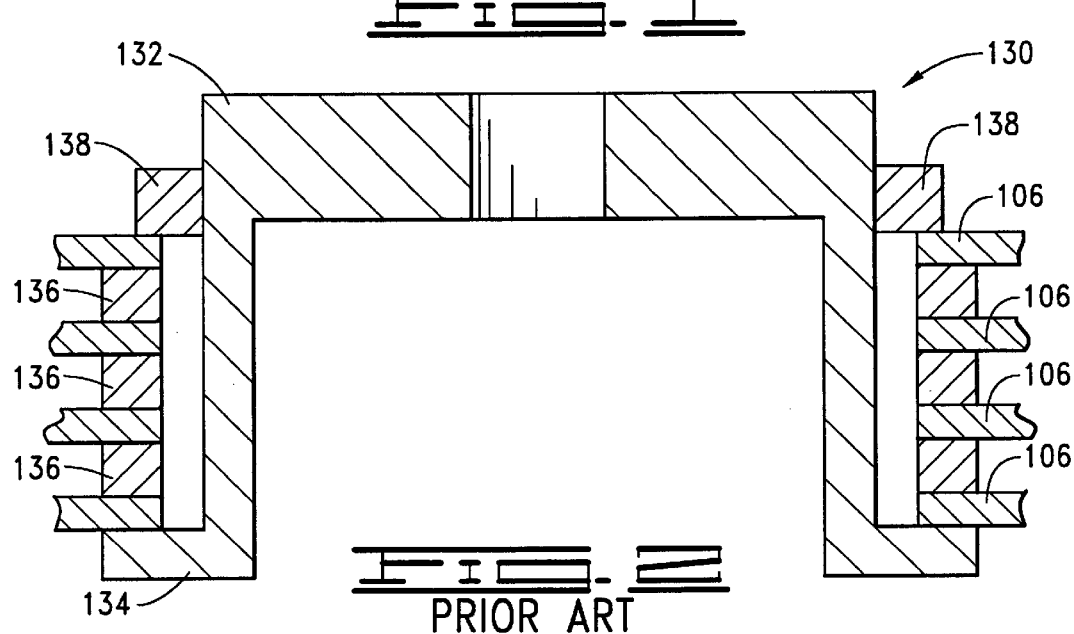
FIG. 2 is an elevational, cross-sectional view of a prior art spindle motor.

Turning now to FIG. 2, shown therein is an elevational, cross-sectional view of a prior art spindle motor 130 which utilizes axial loading to secure the discs 106. As interior portions of the spindle motor 130 are not germane to the present discussion, for purposes of clarity such have been omitted from FIG. 2.

A rotatable hub 132 of the spindle motor 130 rotates about a central axis 133 and includes a radially extending disc support flange 134. A plurality of discs 106 (nominally identical to the discs of FIG. 1) and disc spacers 136 are arranged about an outer hub surface (not designated) to form a disc stack assembly. The disc stack assembly is assembled by placing a first one of the discs 106 over the hub 132 to rest against the disc support flange 134. Disc spacers 136 and discs 106 are alternately added to the disc stack until a desired number of discs 106 have been positioned (four in this example). A disc clamp 138 is then assembled to the upper end of the hub 130 to complete the assembly. As shown, the upper end of the hub 130 has a plurality of circumferentially disposed grooves 140 to provide circumferentially extending teeth 142.

In FIG. 2, the disc clamp 138 is a "shrink-fit" clamp which has an inner diameter that is nominally smaller than the outer diameter of the hub 132. Assembly is accomplished by heating the clamp 138 so that thermal expansion permits the clamp 138 to pass over the hub 132. A desired magnitude of axial loading is applied to the disc clamp 138 while the clamp 138 is allowed to cool and shrink fit onto the hub 132. However, using a thermal "shrink fit" clamp increases manufacturing time because of the time required for the clamp to cool and thereafter effectively clamp the disc stack. Moreover, using a thermal "shrink fit" clamp can increase the cost of manufacturing because of the expensive manufacturing equipment involved.

Figure 3:
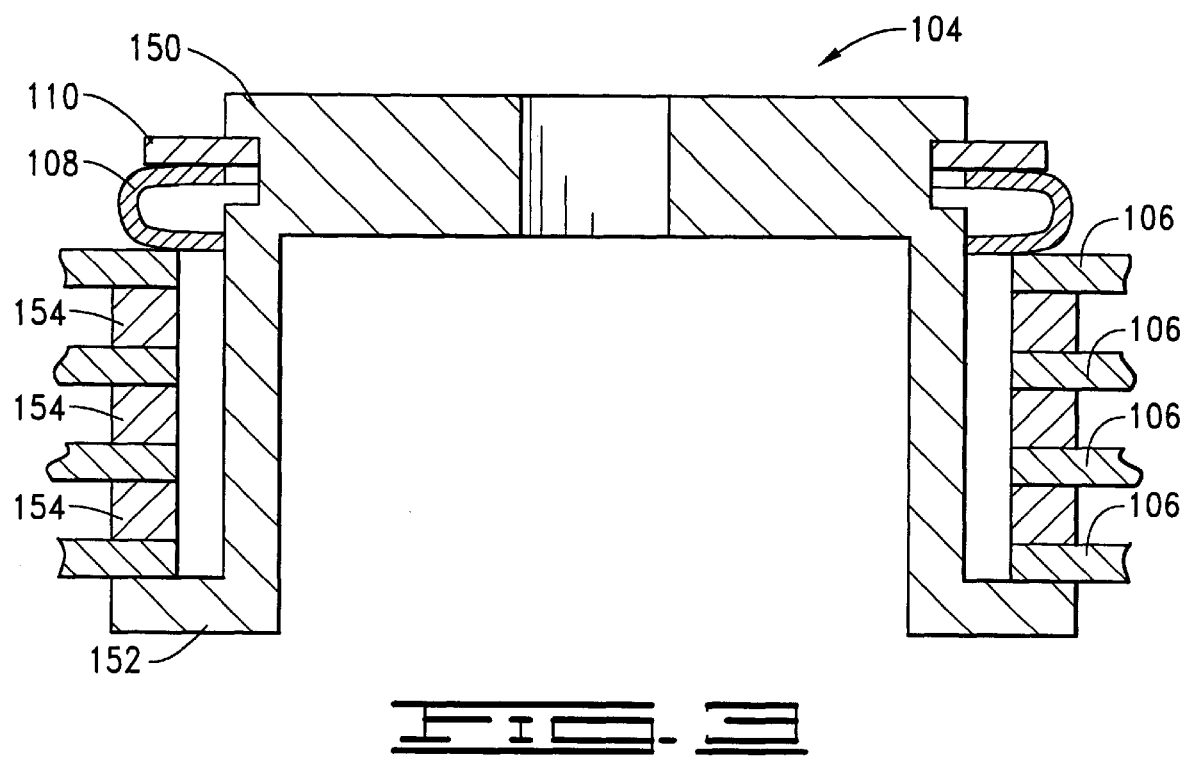
FIG. 3 is an elevational, cross-sectional view of the spindle motor of FIG. 1 illustrating the use of a teeth lock ring constructed and assembled in accordance with preferred embodiments of the present invention.
Figure 4:
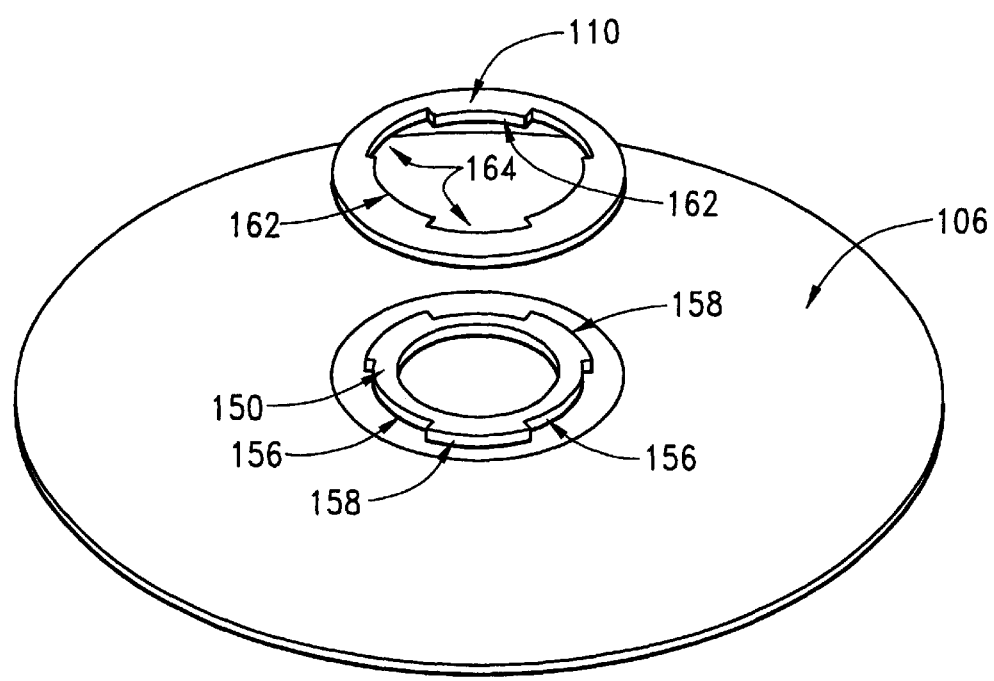
FIG. 4 is an exploded, perspective view of the spindle motor of FIG. 1, illustrating various features of the teeth lock ring of FIG. 3 in greater detail.
Figure 5:
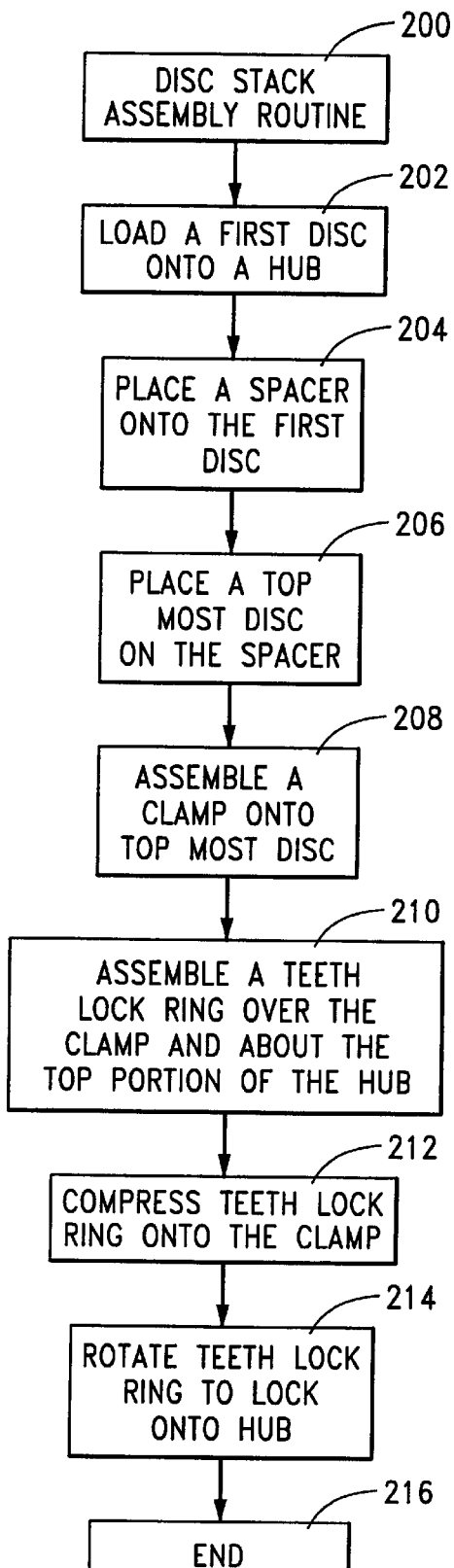
FIG. 5 is a flow chart for a DISC STACK ASSEMBLY routine, generally setting forth preferred steps carried out to assemble the discs and clamping spacers onto the spindle motor hub.

Accordingly, FIGS. 3–5 have been provided to illustrate the use of the teeth lock ring 110 (FIG. 1) of the present invention, which provides more even distribution of clamping force upon a top most disc 106. Turning now to FIG. 3, shown therein is an elevational, cross-sectional view of the spindle motor 104 of the disc drive 100 of FIG. 1. The spindle motor 104 includes a rotatable spindle motor hub 150 which is configured for rotation about a central axis. A disc support flange 152 radially extends from the spindle motor hub 150 to support the discs 106 and spacers 154. The alternately stacked discs 106 and spacers 154 comprise the disc stack assembly.

The spindle motor hub 150 also includes a top portion extending above a top most disc 106 of the disc stack assembly. The top portion includes a plurality of circumferentially disposed grooves 156 and circumferentially extending teeth 158 alternatively disposed about an outer diameter of the top portion. It should be noted that it is contemplated that the number and shape of the grooves 156 and teeth 158 may vary as desired. The clamp 108 is disposed about the top portion and upon application of a clamping force the disc stack is secured to the spindle motor hub 150. The clamping force acts with the disc support flange 152 to effectively clamp the disc stack to the spindle motor hub 150.

As exemplified by a preferred embodiment, the teeth lock ring 110, as shown, compresses onto the clamp 108 and contactingly engages the top portion of the spindle motor hub 150 to provide uniform distribution of the clamping force 160. In particular, FIG. 4 provides an exploded, perspective view of the teeth lock ring 110 in greater detail. As shown, the teeth lock ring 110 fits over the top portion of the spindle motor hub 150 and above the top most disc 106. The teeth lock ring 110 is an annular member with an inner diameter configured to fit over the spindle motor hub 150. The inner diameter further includes a plurality of wedge shaped portions 162 and grooves 164 circumferentially and alternatively disposed thereabout. As shown in FIG. 4, the plurality of the wedge shaped portions 162 correspond to the circumferentially disposed grooves 156 in the top portion of the hub 150 while the grooves 164 correspond to the circumferentially extending teeth 158. Therefore, the plurality of wedge shaped portions 162 and grooves 164 effectively lock into the top portion of the spindle motor hub 150. It should be noted that various numbers and shapes of the grooves and wedge shaped portions are contemplated as being within the scope of the present invention.

To describe the manner in which the teeth lock ring operates to provide substantially even distribution of clamping force, reference is now made to FIG. 5. FIG. 5 provides a flow chart for a DISC STACK ASSEMBLY routine 200, illustrating the preferred steps utilized to assemble the disc stack. Beginning at step 202 in FIG. 5 and with reference to FIG. 3, the first disc 106 is loaded onto the hub 150 and brought to rest upon the disc support flange 152. At step 204, a spacer 154 is placed over the first disc 106 to provide inter-disc spacing. A top most disc 106 is then placed over the hub 150 and on the spacer 154, at step 206. A clamp 108 is then assembled onto the top most disc 106, as shown in step 208. In the preferred embodiment, a spring fit clamp 108 is used. However, as shown in FIG. 3, the clamp 108 pressingly engages the hub 150 at the circumferentially disposed grooves 156. Affixing the clamp 108 with a screw or similar means would unevenly distribute the clamping force upon the top most disc 106, since the clamping force would be concentrated around the screw. Moreover, the clamp 108 would tend to deform within the circumferentially disposed grooves 156 upon application of a clamping force because no support would be provided for the area of the clamp 108 which engages the circumferentially disposed grooves 156. However, the clamp 108 must be affixed in some manner since, as shown in FIG. 3, the portion of the clamp 108 which contacts the circumferentially disposed grooves 156 would otherwise be free to spring up, and thereby be ineffective in containing and distributing the clamping force.

To avoid deformation of the clamp 108, and thereby unequal distribution of clamping force, the teeth lock ring 110 is provide as designated at step 210. Making reference to FIGS. 3 and 4, the teeth lock ring 110 is assembled over the clamp 108 and about the top portion of the hub 150. The plurality of wedge shaped portions 162 and grooves 164 which are alternatively and circumferentially disposed about the inner diameter of the teeth lock ring are aligned with corresponding grooves 156 and teeth 158 on the hub 150.

Then at step 212, the teeth lock ring 110 is compressed onto the clamp 108 to create uniform contact between the clamp 108 and the top most disc 106. In particular, compressing the teeth lock ring 110 upon the clamp 108 provides even contact surface about the inner diameter of the clamp 108 to uniformly distribute the clamping force 160 over the top most disc and thereby prevent disc waviness. Finally, at step 214, the teeth lock ring 110 is rotated to secure each of the grooves 164 within the corresponding circumferentially extending teeth 142 to effectively clamp the disc pack assembly. Rotating the teeth lock ring 110 in essence twists the clamp 108 onto the top most disc to firmly secure the disc stack. The routine then ends. For purposes of the appended claims, the function of the "means for clamping" is carried out by the corresponding structure described above with a compressible clamp member, a teeth lock ring, and a top portion under which the teeth lock ring is twisted under. Hence, prior art structure that fails to include a clamp, a teeth lock ring, and a top portion having teeth are explicitly excluded.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A disc drive, comprising:
   a spindle motor comprising a rotatable spindle motor hub, the spindle motor hub having a top portion, the top portion having circumferentially extending teeth;
   a disc support member extending from the hub;
   a first disc disposed on the disc support member;
   a top most disc disposed between the first disc and a top portion of the spindle motor hub;
   a spacer disposed between the first disc and the top most disc to prevent disc contact;

a clamp placed in contacting engagement with the top most disc and over the top portion of the spindle motor hub so that the first disc, the spacer, and the top most disc are clamped relative to the spindle motor hub in response to a clamping force exerted upon the top most disc by the clamp and the disc support member, and a teeth lock ring placed over the clamp and locking onto the circumferentially extending teeth of the spindle motor hub so that the clamp uniformly contacts the top most disc to provide substantially even distribution of the clamping force.

2. The disc drive of claim 1, wherein the teeth lock ring further comprises:

an annular member having a central opening and being securely affixed about the top portion of the spindle motor hub, the annular member having an inner diameter and an outer diameter; and a plurality of grooves and wedge shaped portions alternatively and circumferentially disposed about the inner diameter for locking the inner diameter onto the spindle motor hub.

3. The disc drive of claim 2, wherein the clamp has an inner diameter and wherein the teeth lock ring is placed atop the clamp so that the plurality of wedge shaped portions compress the inner diameter of the clamp adjacent the grooves on the spindle motor hub.

4. A method for forming a disc stack assembly for use in a disc drive, comprising:

(a) providing a rotatable spindle motor hub with a top portion having circumferentially extending teeth;

(b) loading a top most disc onto the spindle motor hub;

(c) assembling a clamp over the top portion of the spindle motor hub to clamp the disc stack assembly, the clamp contacting the top most disc (d) locking a teeth lock ring atop the clamp and over the top portion of the spindle motor hub, the teeth lock ring having a plurality of grooves and wedge shaped portions so that the grooves lock into corresponding circumferentially extending teeth on the top portion of the spindle motor hub, while the wedge shaped portions lock into corresponding grooves on the top portion of the spindle motor hub; and (e) compressing the teeth lock ring over the clamp to provide substantially even distribution of contact between the clamp and the top most disc.

5. The method of claim 4, wherein the assembling step (d) further comprises:

(d1) aligning the wedge shaped portions with the circumferentially extending teeth of the spindle motor hub.

6. The method of claim 4, wherein the compressing step (e) further comprises:

(e1) pushing the teeth lock ring onto the clamp to create substantially uniform contact between the clamp and the top most disc; and (e2) rotating the teeth lock ring to secure each of the wedge shaped portions within the corresponding circumferentially disposed grooves to effectively clamp the disc stack assembly.

7. A disc stack assembly comprising:

a disc;

a disc support member engaging the disc to provide support and requisite spacing for the disc;

a compressive clamp member for directing a compressive contact force upon the disc and the support member;

a top portion above the compressive clamp member having a plurality of circumferentially extending teeth; and a teeth lock ring placed between the clamp member and the top portion where the engagement of the circumferentially extending teeth of the top portion with the teeth lock ring produce a compressive force onto the clamp member which produces an evenly distributed clamping force across the disc relative to the disc support member.

8. The disc stack assembly of claim 7 wherein the disc support member comprises a bottom flange.

9. The disc stack assembly of claim 7 wherein the teeth lock ring comprises:

an annular member having an inner and outer diameter, providing a central opening and being securely affixed about the top portion and a plurality of grooves and wedge shaped portions alternatively and circumferentially disposed about the inner diameter for interlocking with the circumferentially extending teeth top portion.

10. The disc stack assembly of claim 9 wherein the teeth lock ring is placed atop the clamp member to compress the clamp member evenly over the disc so that the teeth lock ring creates substantially even distribution of contact between the disc and the clamp member, and wherein the teeth lock ring is rotated to interlock the wedge shaped portions of the teeth lock ring with the circumferentially extending teeth of the top portion.

* * * * *